United States Patent
Liu

(10) Patent No.: US 9,711,101 B2
(45) Date of Patent: Jul. 18, 2017

(54) ANALOGY VOLTAGE SOURCE CIRCUIT AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Xiaopeng Liu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 57 days.

(21) Appl. No.: 14/439,875

(22) PCT Filed: Aug. 27, 2014

(86) PCT No.: PCT/CN2014/085334
§ 371 (c)(1),
(2) Date: Apr. 30, 2015

(87) PCT Pub. No.: WO2015/149474
PCT Pub. Date: Oct. 8, 2015

(65) Prior Publication Data
US 2016/0247472 A1 Aug. 25, 2016

(30) Foreign Application Priority Data
Apr. 2, 2014 (CN) .......................... 2014 1 0131409

(51) Int. Cl.
*G09G 3/36* (2006.01)
*H02M 3/156* (2006.01)
*H02M 1/00* (2006.01)

(52) U.S. Cl.
CPC ......... *G09G 3/3648* (2013.01); *G09G 3/3696* (2013.01); *H02M 3/156* (2013.01);
(Continued)

(58) Field of Classification Search
CPC ......... G09G 3/3648; G09G 2300/0426; G09G 2300/043; G09G 2310/0289;
(Continued)

(56) References Cited

U.S. PATENT DOCUMENTS

2007/0132749 A1 6/2007 Peng et al.
2007/0188108 A1 8/2007 Chao et al.
(Continued)

FOREIGN PATENT DOCUMENTS

CN 101018439 A 8/2007
CN 101060753 A 10/2007
(Continued)

OTHER PUBLICATIONS

First Chinese Office Action Appln. No. 201410131409.7; Dated Sep. 2, 2015.
(Continued)

*Primary Examiner* — Sahlu Okebato
(74) *Attorney, Agent, or Firm* — Ladas & Parry LLP

(57) ABSTRACT

An analogy voltage source circuit and a display apparatus. The circuit comprises: a voltage input terminal, a DC-DC converting circuit, a voltage output terminal, a duty ratio control circuit and an output voltage sampling circuit, wherein the output voltage sampling circuit is configured to feed back magnitude of an output voltage to the duty ratio control circuit, and the duty ratio control circuit is configured to control the magnitude of the output voltage of the DC-DC converting circuit according to the feedback of the output voltage sampling circuit. The circuit further comprises: a voltage regulating circuit having an input terminal
(Continued)

for inputting a voltage regulating signal and an output terminal connected to the output voltage sampling circuit. The voltage regulating circuit controls to increase or decrease the feedback of the output voltage sampling circuit according to the voltage regulating signal, such that the output voltage from the voltage output terminal increases or decreases. The analogy voltage source circuit and the display apparatus of the present disclosure are capable of regulating the voltage output from the analogy voltage source on a liquid crystal panel, so as to reduce the power consumption of the liquid crystal panel.

20 Claims, 3 Drawing Sheets

(52) U.S. Cl.
CPC .............. *G09G 2300/043* (2013.01); *G09G 2300/0426* (2013.01); *G09G 2310/0289* (2013.01); *G09G 2330/021* (2013.01); *G09G 2330/023* (2013.01); *H02M 2001/0025* (2013.01); *H02M 2001/0032* (2013.01); *H02M 2001/0045* (2013.01); *Y02B 70/16* (2013.01)

(58) Field of Classification Search
CPC ............ G09G 2330/023; H02M 3/156; H02M 2001/0025; H02M 2001/0032
See application file for complete search history.

(56) References Cited

U.S. PATENT DOCUMENTS

| | | | |
|---|---|---|---|
| 2008/0247198 A1* | 10/2008 | Sugahara | H02M 1/32 363/50 |
| 2011/0025290 A1* | 2/2011 | Chen | H02M 3/155 323/311 |
| 2011/0080102 A1* | 4/2011 | Ge | H05B 33/0815 315/200 R |
| 2012/0146615 A1 | 6/2012 | Tong et al. | |
| 2015/0115908 A1* | 4/2015 | Gambetta | H02M 3/158 323/235 |

FOREIGN PATENT DOCUMENTS

| | | |
|---|---|---|
| CN | 101188383 A | 5/2008 |
| CN | 101236729 A | 8/2008 |
| CN | 101399015 A | 4/2009 |
| CN | 102055338 A | 5/2011 |
| CN | 102158106 A | 8/2011 |
| CN | 102570813 A | 7/2012 |
| CN | 102594135 A | 7/2012 |
| CN | 103943086 A | 7/2014 |

OTHER PUBLICATIONS

International Search Report Appln. No. PCT/CN2014/085334; Dated Dec. 31, 2014.
Written Opinion of the International Searching Authority Appln. No. PCT/CN2014/085334; Dated Dec. 31, 2014.

* cited by examiner

ANALOGY VOLTAGE SOURCE CIRCUIT AND DISPLAY APPARATUS

TECHNICAL FIELD

The present disclosure relates to an analogy voltage source circuit and a display apparatus.

BACKGROUND

Power consumption of a liquid crystal panel of known technique is always a great concern to product design, system verification and client use. Also, reduction of power consumption is always a very important process in product design. In the use of known technique in a device such as a display, notebook, PAD or mobile phone, after the device is in standby for a certain time, the system realizes brightness reduction of the panel by means of reducing backlight brightness or by other means, so as to achieve the purpose of saving power consumption. When the known technique uses a liquid display panel timing control chip compliant with an eDPI.3 interface standard, it adopts a single chip integrated memory to support a panel-self-refresh (PSR) function. The system can enter a PSR mode when displaying a still picture. At this time, the timing control chip will take over a graphics processor to refresh the picture through a built-in buffer storage, so as to reduce load on the graphics processor, so that the graphics processor and the display interface can enter in a low power consumption state to reduce the overall power consumption of the system. Also, the system can update and store a new still picture into the buffer storage through the graphics processor, or get out of the PSR mode to display the constantly changing images, so as to effectively reduce the power consumption of the system and prolong service time of the battery of a notebook computer.

In the liquid crystal panel design of the known technique, an analogy voltage source AVDD used by the liquid crystal panel generally outputs an alternating current AC signal with certain frequency by a converter from a direct current signal to another direct current signal, i.e., a DC-DC converting circuit, to control and generate the required AVDD voltage, and feeds back magnitude of the output voltage to a duty ratio control circuit by an output voltage sampling circuit. Then, the duty ratio control circuit controls the output voltage of the DC-DC converting circuit according to the feedback of the output voltage sampling circuit, so as to guarantee the voltage output by the AVDD output terminal to be maintained at a constant value.

To sum up, the voltage output by the AVDD output terminal needed for the liquid crystal panel of the known technique is constant. When a signal that the system instructs the panel to reduce backlight or perform PSR output is received, it is disadvantageous for reducing the power consumption of the system because the voltage value of AVDD keeps unchanged.

SUMMARY

In embodiments of the present disclosure, there are provided an analogy voltage source circuit and a display apparatus, which are configured to regulate voltage output from an analogy voltage source on a liquid crystal panel, so as to reduce the power consumption of the liquid crystal panel.

The analogy voltage source circuit provided in the embodiments of the present disclosure comprises: a voltage input terminal, a DC-DC converting circuit, a voltage output terminal, a duty ratio control circuit and an output voltage sampling circuit. The output voltage sampling circuit is configured to feed back magnitude of an output voltage to the duty ratio control circuit. The duty ratio control circuit is configured to control the magnitude of the output voltage of the DC-DC converting circuit according to the feedback of the output voltage sampling circuit. Herein, the circuit further comprises: a voltage regulating circuit having an input terminal for inputting a voltage regulating signal and an output terminal connected to the output voltage sampling circuit and for controlling to increase or decrease the feedback of the output voltage sampling circuit according to the voltage regulating signal, so that a voltage output by the voltage output terminal increases or decreases.

In the analogy voltage source circuit provided in the embodiments of the present disclosure, since the circuit further comprises the voltage regulating circuit which has the input terminal for inputting the voltage regulating signal and the output terminal connected to the output voltage sampling circuit and controls to increase or decrease the feedback of the output voltage sampling circuit according to the voltage regulating signal, the voltage output by the voltage output terminal increases or decreases. Therefore, according to the analogy voltage source circuit provided in the embodiments of the present disclosure, the voltage output from the analogy voltage source on the liquid crystal panel can be regulated when a CON signal that the system instructs the panel to reduce backlight or perform PSR output is received, such that the power consumption of the liquid crystal panel can be reduced.

In some embodiments, the output voltage sampling circuit comprises a first resistor and a second resistor connected in series between the voltage output terminal and a grounding point. The first resistor is connected to the voltage output terminal, and the second resistor is connected to the grounding point. The duty ratio control circuit extracts a voltage feedback from a connecting point between the first resistor and the second resistor. The voltage regulating circuit has two output terminals connected to two terminals of the first resistor respectively.

In this way, the actual circuit design will be convenient and simple since the output voltage sampling circuit comprises the first resistor and the second resistor connected in series between the voltage output terminal and the grounding point, the first resistor is connected to the voltage output terminal, and the second resistor is connected to the grounding point, the duty ratio control circuit extracts the voltage feedback from a connecting point between the first resistor and the second resistor, and the voltage regulating circuit has two output terminals connected to two terminals of the first resistor respectively.

In some embodiments, the voltage regulating circuit comprises a third resistor and a switch device. A control electrode of the switch device is input the voltage regulating signal, and the other two electrodes thereof are connected to a first terminal of the first resistor and a first terminal of the third resistor respectively. A second terminal of the third resistor is connected to a second terminal of the first resistor.

In this way, the actual circuit design will be convenient and simple when the voltage regulating circuit comprises the third resistor and the switch device.

In some embodiments, the switch device is a transistor, whose gate is connected to an input terminal of the voltage regulating signal, source is connected to the first terminal of the third resistor, and drain is connected to the first terminal of the first resistor.

In this way, the actual circuit design will be simple and easy to be implemented when the switch device is a transistor.

In some embodiments, the output voltage sampling circuit comprises a first resistor and a second resistor connected in series between the voltage output terminal and the voltage regulating circuit. The first resistor is connected to the voltage output terminal, and the second resistor is connected to the voltage regulating circuit. The duty ratio control circuit extracts a voltage feedback from a connecting point between the first resistor and the second resistor. The voltage regulating circuit has two output terminals connected to a terminal of the second resistor that is close to a grounding point and the grounding point respectively.

In this way, the actual circuit design will be convenient, simple and easy to be implemented since the output voltage sampling circuit comprises the first resistor and the second resistor connected in series between the voltage output terminal and the voltage regulating circuit, the first resistor is connected to the voltage output terminal, the second resistor is connected to the voltage regulating circuit, the duty ratio control circuit extracts the voltage feedback from the connecting point between the first resistor and the second resistor, and the voltage regulating circuit has two output terminals connected to a terminal of the second resistor that is close to the grounding point and the grounding point respectively.

In some embodiments, the voltage regulating circuit comprises a third resistor and a switch device. A control electrode of the switch device is input the voltage regulating signal, and the other two electrodes thereof are connected to a terminal of the second resistor that is close to a grounding point and the grounding point respectively. A first terminal of the third resistor is connected to the terminal of the second resistor that is close to the grounding point, and a second terminal of the third resistor is connected to the grounding point.

In this way, the actual circuit design will be convenient and simple when the voltage regulating circuit comprises the third resistor and the switch device.

In some embodiments, the switch device is a transistor, whose gate is connected to an input terminal of the voltage regulating signal, source is connected to the first terminal of the third resistor, and drain is connected to the grounding point.

In this way, the actual circuit design will be simple and easy to be implemented when the switch device is a transistor.

In some embodiments, when the transistor is an N type thin film transistor, the N type thin film transistor is turned off if the voltage regulating signal is a low level signal, and turned on if the voltage regulating signal is a high level signal.

In this way, the actual circuit will be convenient and simple when the transistor is an N type thin film transistor which is turned off if the voltage regulating signal is a low level signal and turned on if the voltage regulating signal is a high level signal.

In some embodiments, when the transistor is a P type thin film transistor, the P type thin film transistor is turned on if the voltage regulating signal is a low level signal, and turned off if the voltage regulating signal is a high level signal.

In this way, the actual circuit will be convenient and simple when the transistor is a P type thin film transistor which is turned on if the voltage regulating signal is a low level signal and turned off if the voltage regulating signal is a high level signal.

In some embodiments, the voltage regulating circuit is integrated inside the duty ratio control circuit.

In this way, the actual circuit will be convenient and simple when the voltage regulating circuit is integrated inside the duty ratio control circuit.

In the embodiments of the present disclosure, there is further provided a display apparatus comprising the analogy voltage source circuit as described above.

According to the display apparatus provided in the embodiments of the present disclosure, the power consumption of the display apparatus provided in the embodiments of the present disclosure can be reduced since the apparatus comprises the analogy voltage source circuit as described above.

DETAILED DESCRIPTION

In embodiments of the present disclosure, there are provided an analogy voltage source circuit and a display apparatus, which are configured to regulate a voltage output from an analog voltage source on a liquid crystal panel, so as to reduce power consumption of the liquid crystal panel.

Figure 1:
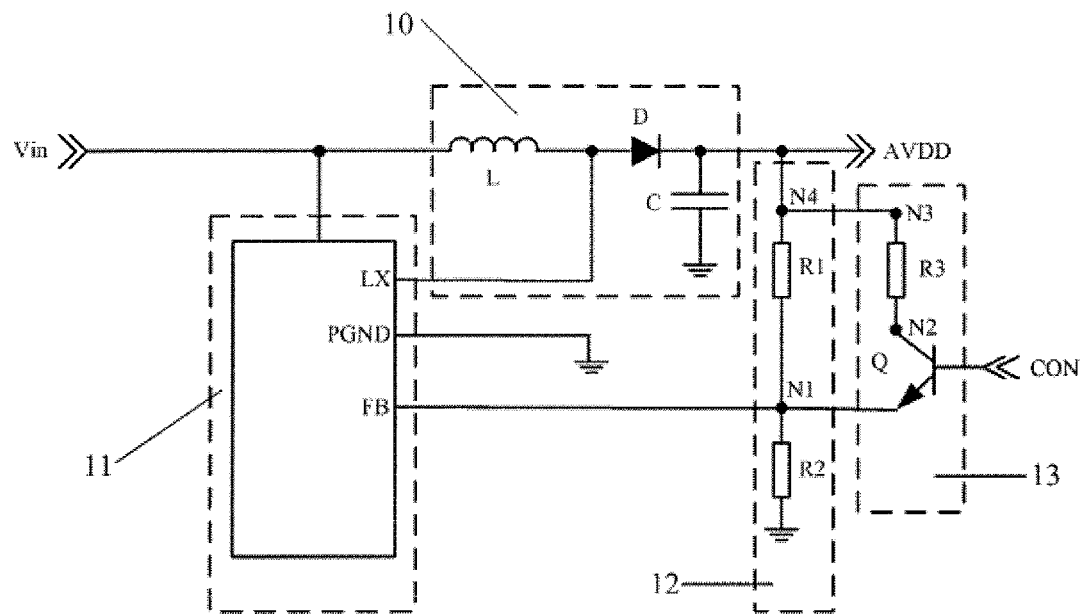
FIG. 1 is a schematic diagram of a structure of an analog voltage source circuit provided in an embodiment of the present disclosure.

As shown in FIG. 1, an analogy voltage source circuit is provided in an exemplary embodiment of the present disclosure. The circuit comprises: a voltage input terminal Vin, a DC-DC converting circuit 10, a voltage output terminal AVDD, a duty ratio control circuit 11 and an output voltage sampling circuit 12. The output voltage sampling circuit 12 is configured to feed back magnitude of an output voltage to the duty ratio control circuit 11. The duty ratio control circuit 11 is configured to control the magnitude of the output voltage of the DC-DC converting circuit 10 according to the feedback of the output voltage sampling circuit 12. Herein, the circuit further comprises: a voltage regulating circuit 13 having an input terminal for inputting a voltage regulating signal and an output terminal connected to the output voltage sampling circuit 12. The voltage regulating circuit 13 controls to increase or decrease the feedback of the output voltage sampling circuit 12 according to the voltage regulating signal, so that the voltage output by the voltage output terminal AVDD increases or decreases. In the exemplary embodiment of the present disclosure, the voltage output by the voltage output terminal AVDD decreases when the liquid crystal panel switches from a normal operation state into a power-saving operation state, and the voltage output by the voltage output terminal AVDD increases when the liquid crystal panel switches from the power-saving operation state into the normal operation state.

A method for decreasing the voltage output by the voltage output terminal when the analogy voltage source circuit provided in the exemplary embodiment of the present disclosure switches from the normal operation state to the power-saving operation state will be described in detail with reference to the accompanying drawings.

As shown in FIG. 1, the DC-DC converting circuit 10, the duty ratio control circuit 11 and the output voltage sampling circuit 12 in the analogy voltage source circuit provided in the exemplary embodiment of the present disclosure are currently common circuits for generating a stable AVDD voltage, where the DC-DC converting circuit 10 comprises an induction coil L, a diode D and a capacitor C. The induction coil L, the diode D and the capacitor C constitute a major loop of the DC-DC converting circuit 10. A pin LX in the duty ratio control circuit 11 is a pin for a pulse width modulation (PWM) signal, the PWM signal output by the pin LX is coupled to the induction coil L, and the magnitude of the output voltage of the DC-DC converting circuit 10 is controlled according to the feedback of the output voltage sampling circuit 12. A pin FB in the duty ratio control circuit 11 is a pin of a voltage sampling loop, and the output voltage sampling circuit 12 is configured to feed back the magnitude of the output voltage to the duty ratio control circuit 11. The duty ratio control circuit 11 is connected to ground through a pin PGND. The DC-DC converting circuit 10, the duty ratio control circuit 11 and the output voltage sampling circuit 12 are same as those in the known technique, and thus their operation principle is same as that in the known technique. Therefore, no further details are provided herein.

In the exemplary embodiment of the present disclosure, the input terminal of the voltage regulating circuit 13 is connected to an input terminal CON for inputting the voltage regulating signal, and the output terminal thereof is connected to the output voltage sampling circuit 12. The voltage regulating circuit 13 controls to increase or decrease the feedback of the output voltage sampling circuit 12 according to the voltage regulating signal, so that the voltage output by the voltage output terminal AVDD increases or decreases.

The output voltage sampling circuit 12 comprises a first resistor R1 and a second resistor R2 connected in series between the voltage output terminal AVDD and a grounding point. The first resistor R1 is connected to the voltage output terminal AVDD, and the second resistor R2 is connected to the grounding point. The duty ratio control circuit 11 extracts a voltage feedback from a connecting point between the first resistor R1 and the second resistor R2.

The voltage regulating circuit 13 has two output terminals connected to two terminals of the first resistor R1 respectively. For example, the voltage regulating circuit 13 in the exemplary embodiment of the present disclosure comprises a third resistor R3 and a switch device Q. A control electrode of the switch device Q is connected to the voltage regulating signal input terminal CON, and the other two electrodes thereof are connected to a first terminal N1 of the first resistor R1 and a first terminal N2 of the third resistor R3, respectively. A second terminal N3 of the third resistor R3 is connected to a second terminal N4 of the first resistor R1. The switch device Q in the exemplary embodiment of the present disclosure is a transistor Q, whose gate is connected to the voltage regulating signal input terminal CON, source is connected to the first terminal N2 of the third resistor R3, and drain is connected to the first terminal N1 of the first resistor R1. When the transistor Q is an N type thin film transistor, the N type thin film transistor is turned off if the voltage regulating signal is a low level signal and turned on if the voltage regulating signal is a high level signal. When the transistor Q is a P type thin film transistor, the P type thin film transistor is turned on if the voltage regulating signal is a low level signal and turned off if the voltage regulating signal is a high level signal.

The transistor Q in the exemplary embodiment of the present disclosure will be described by taking the N type thin film transistor as an example. The voltage regulating signal input by the voltage regulating signal input terminal CON comes from a system terminal of the liquid crystal panel. The voltage regulating signal input by the voltage regulating signal input terminal CON in the exemplary embodiment of the present disclosure is a low level signal or a high level signal.

When the voltage regulating signal is a low level signal, the transistor Q is turned off, and the voltage regulating circuit 13 does not operate. At this time, the analogy voltage source circuit provided in the exemplary embodiment of the present disclosure is the same as the analogy voltage source circuit of the known technique, and the equation for determining the voltage output by the AVDD output terminal is: $V_{AVDD}=(1+R1/R2)*V_{FB}$.

When the voltage regulating signal is a high level signal, the transistor Q is turned on, the voltage regulating circuit 13 starts to operate. At this time, the third resistor R3 is connected with the first resistor R1 in parallel, and then is connected with the second resistor R2 in series. At this time, the voltage output by the AVDD output terminal in the analogy voltage source circuit provided in the exemplary embodiment of the present disclosure changes, and the equation for determining the voltage output by the AVDD output terminal is: $V_{AVDD}=(1+(R1//R3)/R2)*V_{FB}$, where R1//R3 represents a resistance value obtained after the first resistor R1 and the third resistor R3 are connected in parallel.

The pin FB of the duty ratio control circuit 11 in FIG. 1 is a pin of the voltage sampling loop and is configured to receive the feedback voltage $V_{FB}$ from the two terminals of the second resistor R2. If the received feedback voltage $V_{FB}$ is different from a feedback voltage reference voltage preset in the duty ratio control circuit 11, then the received feedback voltage $V_{FB}$ is regulated by the duty ratio control circuit 11, so that the value of the feedback voltage $V_{FB}$ keeps unchanged.

Since the resistance value R1//R3 obtained after the first resistor R1 and the third resistor R3 are connected in parallel is smaller than the resistance value R1 of the first resistor R1, from a comparison between the equations $V_{AVDD}=(1+R1/R2)*V_{FB}$ and $V_{AVDD}=(1+(R1//R3)/R2)*V_{FB}$, it can be obtained that the value of the voltage output by the AVDD output terminal after regulation is performed by the voltage regulating circuit 13 in the exemplary embodiment of the present disclosure is smaller than the value of the voltage output by the AVDD output terminal in the known technique.

The analogy voltage source circuit provided in the exemplary embodiment of the present disclosure can controllably regulate the value of the voltage output by the AVDD output terminal in real time. For example, the value range of the resistance value of the third resistor R3 in the voltage adjusting circuit 13 in the exemplary embodiment of the present disclosure can be set to 50KΩ-100KΩ. In the analogy voltage source circuit provided in the exemplary embodiment of the present disclosure, the amplitude, frequency, and duty ratio of the voltage regulating signal input by the voltage regulating signal input terminal CON can be regulated through the system terminal of the liquid crystal panel. Such regulation will cause that the analogy resistance value between the two terminals of the transistor Q connected to the voltage regulating signal is different when the transistor Q is turned on, and then the ratio of R1//R3 to R2 is different, thereby resulting in that the value of the voltage output by the AVDD output terminal is different. A specific value for a decrease of the voltage output by the AVDD output terminal in the exemplary embodiment of the present disclosure can be regulated according to the actual requirement for the system or the liquid crystal panel.

Figure 2:
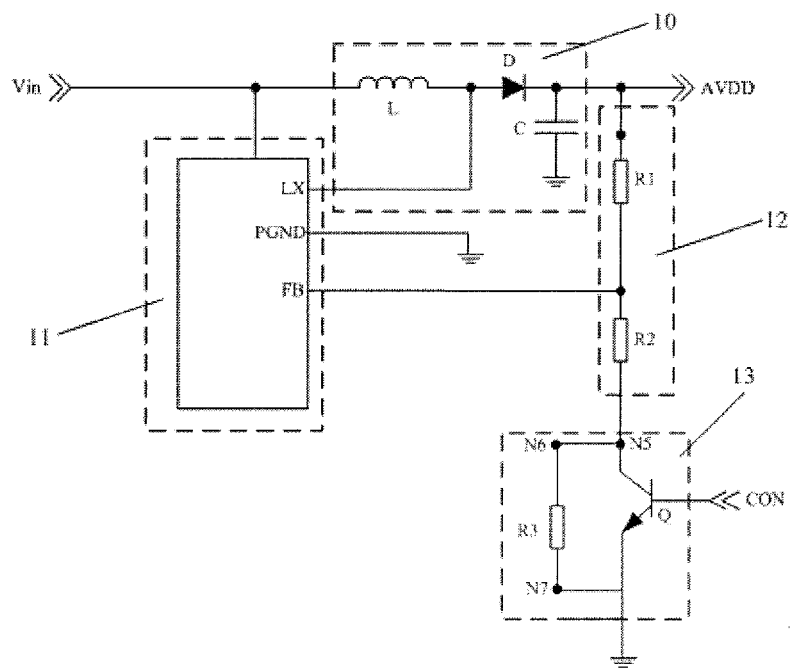
FIG. 2 is a schematic diagram of a structure of another analogy voltage source circuit provided in an embodiment of the present disclosure.

As show in FIG. 2, it is another analogy voltage source circuit provided in an exemplary embodiment of the present disclosure, the output voltage sampling circuit 12 comprises the first resistor R1 and the second resistor R2 connected in serial between the voltage output terminal AVDD and the voltage regulating circuit 13. The first resistor R1 is connected to the voltage output terminal AVDD, and the second resistor R2 is connected to the voltage regulating circuit 13. The duty ratio control circuit 11 extracts a feedback voltage from a connecting point between the first resistor R1 and the second resistor R2. The voltage regulating circuit 13 has two output terminals connected to one terminal of the second resistor R2 that is close to a grounding point and the grounding point respectively.

For example, the voltage regulating circuit 13 in the exemplary embodiment of the present disclosure comprises a third resistor R3 and a switch device Q. A control electrode of the switch device Q is connected to the voltage regulating signal input terminal CON, and the other two electrodes thereof are connected to a terminal N5 of the second resistor R2 that is close to the grounding point and the grounding point, respectively. A first terminal N6 of the third resistor R3 is connected to the terminal N5 of the second resistor R2 that is close to the grounding point, and a second terminal N7 of the third resistor R3 is connected to the grounding point. The switch device Q in the exemplary embodiment of the present disclosure is the transistor Q, whose gate is connected to the voltage regulating signal input terminal CON, source is connected to the first terminal N6 of the third resistor R3, and drain is connected to the grounding point. When the transistor Q is an N type thin film transistor, the N type thin film transistor is turned off if the voltage regulating signal is a low level signal and turned on if the voltage regulating signal is a high level signal. When the transistor Q is a P type thin film transistor, the P type thin film transistor is turned on if the voltage regulating signal is a low level signal and turned off if the voltage regulating signal is a high level signal.

The transistor Q in the exemplary embodiment of the present disclosure will be described by taking the N type thin film transistor as an example. The voltage regulating signal input by the voltage regulating signal input terminal CON comes from a system terminal of the liquid crystal panel. The voltage regulating signal input by the voltage regulating signal input terminal CON in the exemplary embodiment of the present disclosure is a low level signal or a high level signal.

When the voltage regulating signal is a high level signal, the transistor Q is turned on. At this time, the analogy voltage source circuit provided in the exemplary embodiment of the present disclosure is the same as the analogy voltage source circuit of the known technique, and the equation for determining the voltage output by the AVDD output terminal is: $V_{AVDD}=(1+R1/R2)*V_{FB}$.

When the voltage regulating signal is a low level signal, the transistor Q is turned off. At this time, the third resistor R3 is connected with the second resistor R2 in series, and then is connected with the first resistor R1 in series. At this time, the voltage output by the AVDD output terminal in the analogy voltage source circuit provided in the exemplary embodiment of the present disclosure changes, and the equation for determining the voltage output by the AVDD output terminal is: $V_{AVDD}=(1+R1/(R2+R3))*V_{FB}$.

The pin FB of the duty ratio control circuit 11 in FIG. 2 is a pin of the voltage sampling loop and is configured to receive the feedback voltage $V_{FB}$ from the second resistor R2 and the third resistor R3 connected in series. If the received feedback voltage $V_{FB}$ is different from the feedback voltage reference voltage preset in the duty ratio control circuit 11, then the received feedback voltage $V_{FB}$ is regulated by the duty ratio control circuit 11, so that the value of the feedback voltage $V_{FB}$ keeps unchanged.

From a comparison between the equations $V_{AVDD}=(1+R1/R2)*V_{FB}$ and $V_{AVDD}=(1+R1/(R2+R3))*V_{FB}$, it can be obtained that the value of the voltage output by the AVDD output terminal after regulation is performed by the voltage regulating circuit 13 in the exemplary embodiment of the present disclosure is smaller than the value of the voltage output by the AVDD output terminal in the known technique.

The analogy voltage source circuit provided in the exemplary embodiment of the present disclosure can controllably regulate the value of the voltage output by the AVDD output terminal in real time. For example, the value range of the resistance value of the third resistor R3 in the voltage adjusting circuit 13 in the exemplary embodiment of the present disclosure can be set to 50KΩ-100KΩ. A specific value for a decrease of the voltage output by the AVDD output terminal in the exemplary embodiment of the present disclosure can be regulated according to the actual requirement for the system or the liquid crystal panel.

In actual application of the liquid crystal panel, after the voltage output by the AVDD output terminal decreases, quality of an image displayed on the liquid crystal panel will also decrease, for example, image color or Gamma characteristic will become worse, or even image abnormality may occur. Therefore, with a premise of guaranteeing to enable the liquid crystal panel to display normally after the voltage output by the AVDD output terminal decreases, it is needed to regulate the voltage output by the AVDD output terminal through the voltage regulating circuit 13 of the exemplary embodiment of the present disclosure according to the system or client's requirement for the image display on the liquid crystal panel.

Figure 3:
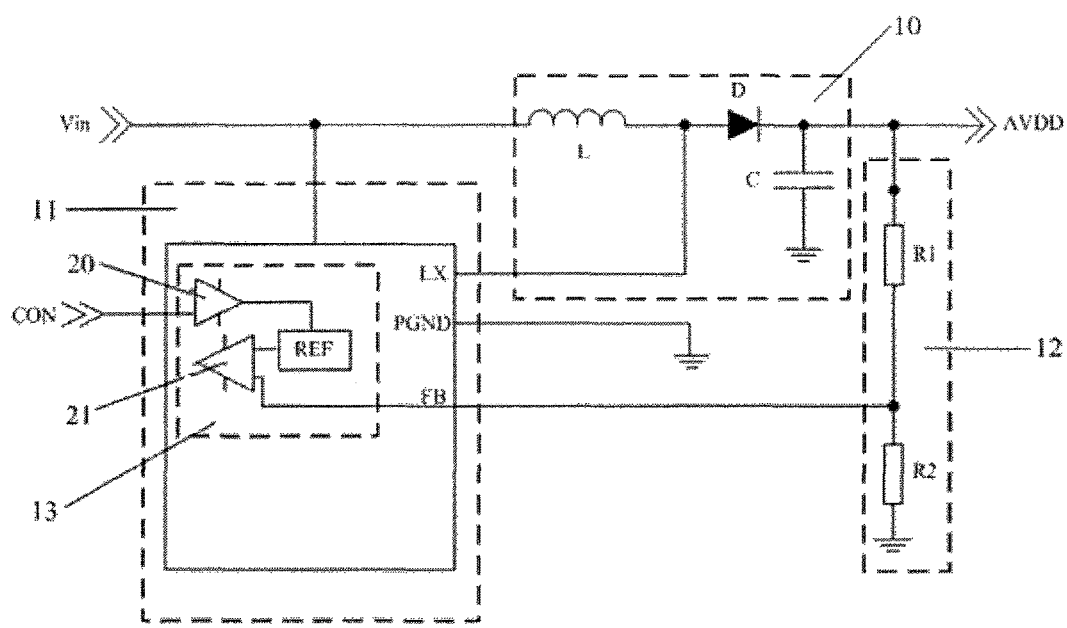
FIG. 3 is a schematic diagram of a structure of a third analogy voltage source circuit provided in an embodiment of the present disclosure.
Figure 4A:
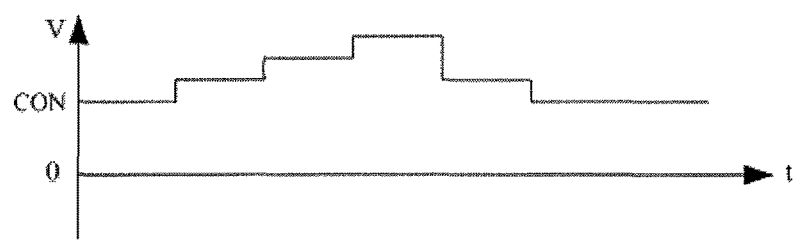
FIGS. 4(a), 4(b) and 4(c) are timing diagrams of a voltage regulating signal, a feedback voltage $V_{FB}$ and an output voltage of the analogy voltage source circuit in FIG. 3.
Figure 4B:
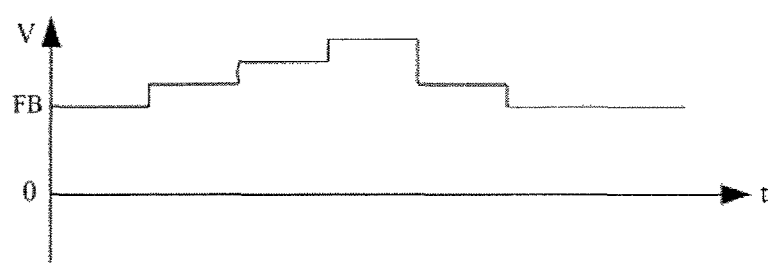
Figure 4C:
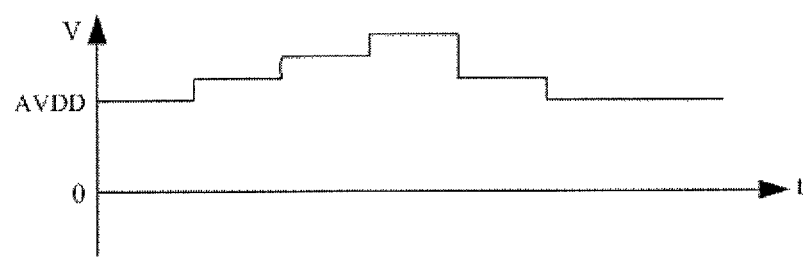

As shown in FIG. 3, another analogy voltage source circuit is further provided in an exemplary embodiment of the present disclosure. The voltage regulating circuit 13 is disposed inside the duty ratio control circuit 11, wherein, inside the voltage regulating circuit 13, there is disposed a receiving and recognizing module 20 that receives and recognizes the voltage regulating signal delivered to the voltage regulating circuit 13 in real time. The voltage regulating signal input terminal CON is connected to the receiving and recognizing module 20 inside the voltage regulating circuit 13 through a pin of the duty ratio control circuit 11. The timing diagram of the voltage regulating signal input by the voltage regulating signal input terminal CON to the voltage regulating circuit 13 is as shown in FIG. 4(a). After the amplitude, duty ratio or frequency of the voltage regulating signal is calculated and converted through the receiving and recognizing module 20 inside the voltage regulating circuit 13, a regulating signal that controls the reference voltage of the duty ratio control circuit 11 is output, so as to change the value of the reference voltage of the duty ratio control circuit 11. After the value of the reference voltage is changed, a feedback regulating module 21 inside the voltage regulating circuit 13 will regulate the received feedback voltage $V_{FB}$, so that the regulated feedback voltage $V_{FB}$ is the same as the reference voltage regulated through the receiving and recognizing module 20 in the exemplary embodiment of the present disclosure. The timing diagram of the feedback voltage $V_{FB}$ after change is as shown in FIG. 4(b). According to the above description, the equation for calculating the voltage output by the AVDD output terminal is: $V_{AVDD}=(1+R1/R2)*V_{FB}$. Since $V_{FB}$ changes, the voltage output by the AVDD output terminal will also change. At this time, the timing diagram of the voltage output by the AVDD output terminal is as shown in FIG. 4(c).

Obviously, those skilled in the art can make various alternations and modifications to the present disclosure without departing from the spirit and disclosure of the present disclosure. As such, if these alternations and modifications fall into the scope of the claims of the present disclosure as well as their equivalents, then the present disclosure intends to comprise these alternations and modifications.

The present application claims the priority of Chinese Patent Application No. 201410131409.7 filed on Apr. 2, 2014, entire content of which is incorporated as part of the present disclosure by reference.

What is claimed is:

1. An analogy voltage source circuit, comprising: a voltage input terminal, a DC-DC converting circuit, a voltage output terminal configured to output an output voltage, a duty ratio control circuit and an output voltage sampling circuit, wherein the output voltage sampling circuit is configured to provide a feedback signal that is related to magnitude of the output voltage to the duty ratio control circuit, and the duty ratio control circuit is configured to control the magnitude of the output voltage of the DC-DC converting circuit according to the feedback signal of the output voltage sampling circuit, and wherein the analogy voltage source circuit further comprises:
  a voltage regulating circuit having an input terminal configured to receive an input of a voltage regulating signal from a system terminal of a liquid crystal panel and an output terminal connected to the output voltage sampling circuit, and the voltage regulating circuit being configured to control to increase or decrease the feedback signal outputted from the output voltage sampling circuit according to the voltage regulating signal from the system terminal of the liquid crystal panel, so that voltage output by the voltage output terminal increases or decreases.

2. The analogy voltage source circuit according to claim 1, wherein the output voltage sampling circuit comprises a first resistor and a second resistor connected in series between the voltage output terminal and a grounding point, wherein
  the first resistor is connected to the voltage output terminal, the second resistor is connected to the grounding point, the duty ratio control circuit extracts a voltage feedback from a connecting point between the first resistor and the second resistor, and the voltage regulating circuit has two output terminals connected to two terminals of the first resistor respectively.

3. The analogy voltage source circuit according to claim 2, wherein the voltage regulating circuit comprises a third resistor and a switch device, wherein
  a control electrode of the switch device is input the voltage regulating signal, the other two electrodes thereof are connected to a first terminal of the first resistor and a first terminal of the third resistor respectively; and
  a second terminal of the third resistor is connected to a second terminal of the first resistor.

4. The analogy voltage source circuit according to claim 3, wherein the switch device is a transistor, whose gate is connected to an input terminal of the voltage regulating signal, source is connected to the first terminal of the third resistor, and drain is connected to the first terminal of the first resistor.

5. The analogy voltage source circuit according to claim 1, wherein the output voltage sampling circuit comprises a first resistor and a second resistor connected in series between the voltage output terminal and the voltage regulating circuit, wherein
  the first resistor is connected to the voltage output terminal, the second resistor is connected to the voltage regulating circuit, the duty ratio control circuit extracts a voltage feedback from a connecting point between the first resistor and the second resistor, and the voltage regulating circuit has two output terminals connected to a terminal of the second resistor that is close to the grounding point and the grounding point respectively.

6. The analogy voltage source circuit according to claim 5, wherein the voltage regulating circuit comprises a third resistor and a switch device, wherein
  a control electrode of the switch device is input the voltage regulating signal, and the other two electrodes thereof are connected to a terminal of the second resistor that is close to the grounding point and the grounding point respectively; and
  a first terminal of the third resistor is connected to the terminal of the second resistor that is close to the grounding point, and a second terminal of the third resistor is connected to the grounding point.

7. The analogy voltage source circuit according to claim 6, wherein the switch device is a transistor, whose gate is connected to an input terminal of the voltage regulating signal, source is connected to the first terminal of the third resistor, and drain is connected to the grounding point.

8. The analogy voltage source circuit according to claim 4, wherein
  when the transistor is an N type thin film transistor, the N type thin film transistor is turned off if the voltage regulating signal is a low level signal and turned on if the voltage regulating signal is a high level signal;
  when the transistor is a P type thin film transistor, the P type thin film transistor is turned on if the voltage regulating signal is a low level signal and turned off if the voltage regulating signal is a high level signal.

9. The analogy voltage source circuit according to claim 7, wherein
  when the transistor is an N type thin film transistor, the N type thin film transistor is turned off if the voltage regulating signal is a low level signal and turned on if the voltage regulating signal is a high level signal;
  when the transistor is a P type thin film transistor, the P type thin film transistor is turned on if the voltage regulating signal is a low level signal and turned off if the voltage regulating signal is a high level signal.

10. The analogy voltage source circuit according to claim 1, wherein the voltage regulating circuit is integrated inside the duty ratio control circuit.

11. A display apparatus comprising an analogy voltage source circuit, wherein the analogy voltage source circuit comprises: a voltage input terminal, a DC-DC converting circuit, a voltage output terminal configured to output an output voltage, a duty ratio control circuit and an output voltage sampling circuit, wherein the output voltage sampling circuit is configured to provide a feedback signal that is related to magnitude of the output voltage to the duty ratio control circuit, and the duty ratio control circuit is configured to control the magnitude of the output voltage of the DC-DC converting circuit according to the feedback signal of the output voltage sampling circuit, and wherein the analogy voltage source circuit further comprises:

a voltage regulating circuit having an input terminal configured to receive an input of a voltage regulating signal from a system terminal of a liquid crystal panel and an output terminal connected to the output voltage sampling circuit, and the voltage regulating circuit being configured to control to increase or decrease the feedback signal outputted from the output voltage sampling circuit according to the voltage regulating signal from the system terminal of the liquid crystal panel, so that voltage output by the voltage output terminal increases or decreases.

12. The display apparatus according to claim 11, wherein the output voltage sampling circuit comprises a first resistor and a second resistor connected in series between the voltage output terminal and a grounding point, wherein the first resistor is connected to the voltage output terminal, the second resistor is connected to the grounding point, the duty ratio control circuit extracts a voltage feedback from a connecting point between the first resistor and the second resistor, and the voltage regulating circuit has two output terminals connected to two terminals of the first resistor respectively.

13. The display apparatus according to claim 12, wherein the voltage regulating circuit comprises a third resistor and a switch device, wherein a control electrode of the switch device is input the voltage regulating signal, the other two electrodes thereof are connected to a first terminal of the first resistor and a first terminal of the third resistor respectively; and a second terminal of the third resistor is connected to a second terminal of the first resistor.

14. The display apparatus according to claim 13, wherein the switch device is a transistor, whose gate is connected to an input terminal of the voltage regulating signal, source is connected to the first terminal of the third resistor, and drain is connected to the first terminal of the first resistor.

15. The display apparatus according to claim 11, wherein the output voltage sampling circuit comprises a first resistor and a second resistor connected in series between the voltage output terminal and the voltage regulating circuit, wherein the first resistor is connected to the voltage output terminal, the second resistor is connected to the voltage regulating circuit, the duty ratio control circuit extracts a voltage feedback from a connecting point between the first resistor and the second resistor, and the voltage regulating circuit has two output terminals connected to a terminal of the second resistor that is close to the grounding point and the grounding point respectively.

16. The display apparatus according to claim 15, wherein the voltage regulating circuit comprises a third resistor and a switch device, wherein a control electrode of the switch device is input the voltage regulating signal, and the other two electrodes thereof are connected to a terminal of the second resistor that is close to the grounding point and the grounding point respectively; and a first terminal of the third resistor is connected to the terminal of the second resistor that is close to the grounding point, and a second terminal of the third resistor is connected to the grounding point.

17. The display apparatus according to claim 16, wherein the switch device is a transistor, whose gate is connected to an input terminal of the voltage regulating signal, source is connected to the first terminal of the third resistor, and drain is connected to the grounding point.

18. The display apparatus according to claim 14, wherein when the transistor is an N type thin film transistor, the N type thin film transistor is turned off if the voltage regulating signal is a low level signal and turned on if the voltage regulating signal is a high level signal;

when the transistor is a P type thin film transistor, the P type thin film transistor is turned on if the voltage regulating signal is a low level signal and turned off if the voltage regulating signal is a high level signal.

19. The display apparatus according to claim 17, wherein when the transistor is an N type thin film transistor, the N type thin film transistor is turned off if the voltage regulating signal is a low level signal and turned on if the voltage regulating signal is a high level signal;

when the transistor is a P type thin film transistor, the P type thin film transistor is turned on if the voltage regulating signal is a low level signal and turned off if the voltage regulating signal is a high level signal.

20. The display apparatus according to claim 11, wherein the voltage regulating circuit is integrated inside the duty ratio control circuit.

* * * * *